Jan. 1, 1952
F. FENTON
2,581,246
APPARATUS FOR LOADING VULCANIZING MOLDS
Filed July 21, 1945
4 Sheets-Sheet 1
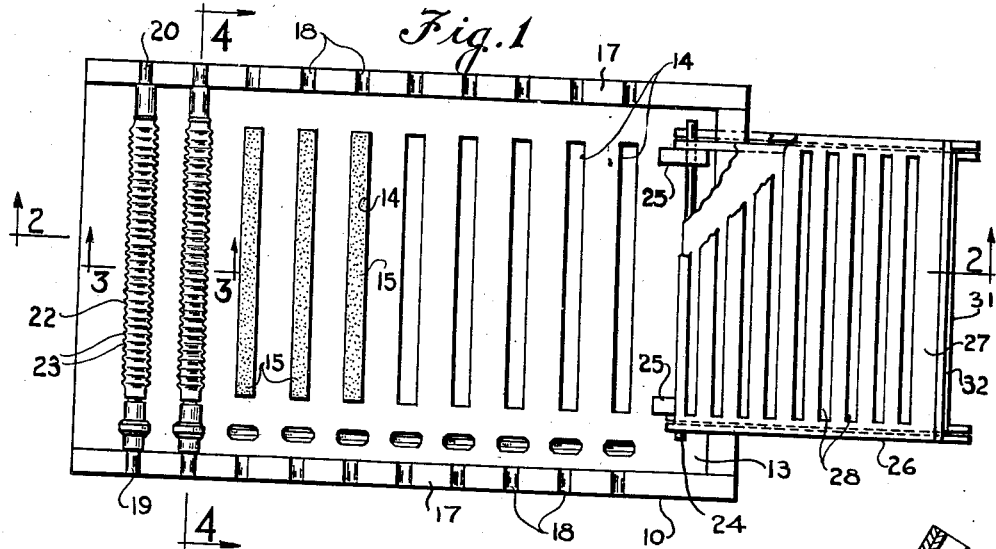
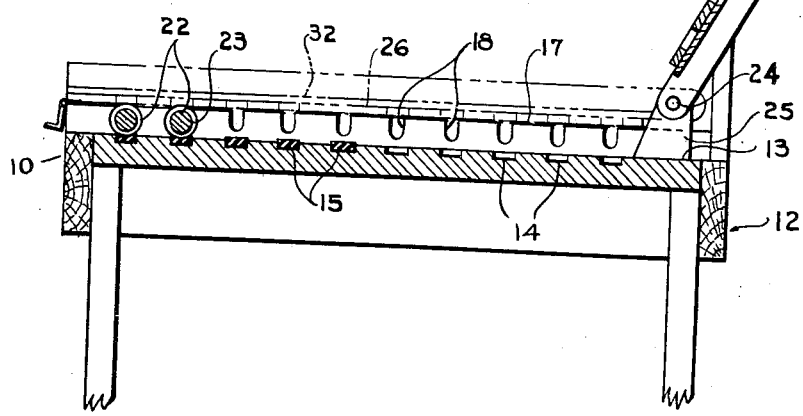
INVENTOR.
Frank Fenton
BY William Cleland
Attorney Jan. 1, 1952  F. FENTON  2,581,246
APPARATUS FOR LOADING VULCANIZING MOLDS
Filed July 21, 1945  4 Sheets-Sheet 2
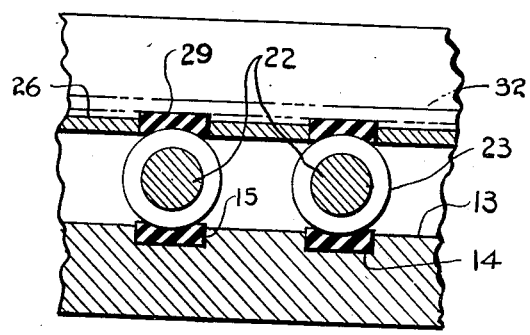
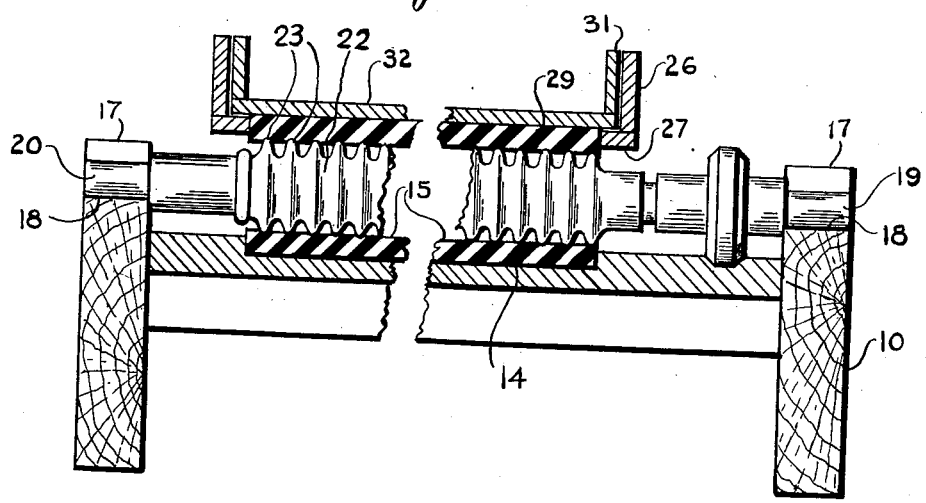
INVENTOR.
Frank Fenton
BY William Cleland
Attorney Jan. 1, 1952 F. FENTON 2,581,246
APPARATUS FOR LOADING VULCANIZING MOLDS
Filed July 21, 1945 4 Sheets-Sheet 3
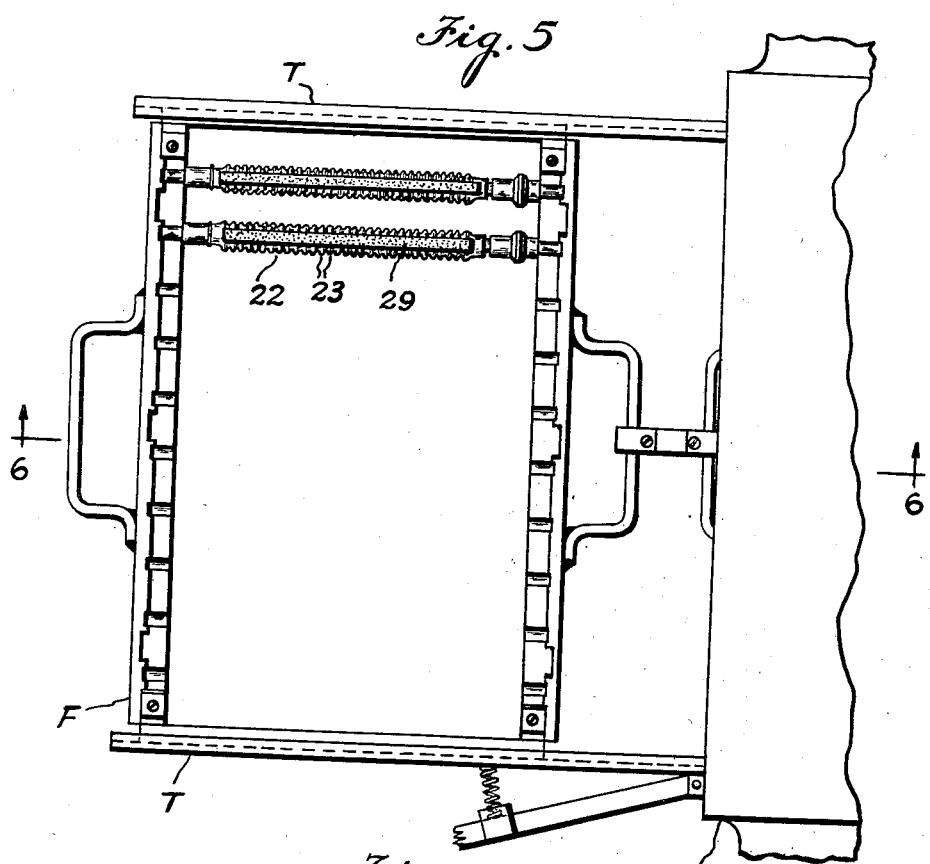
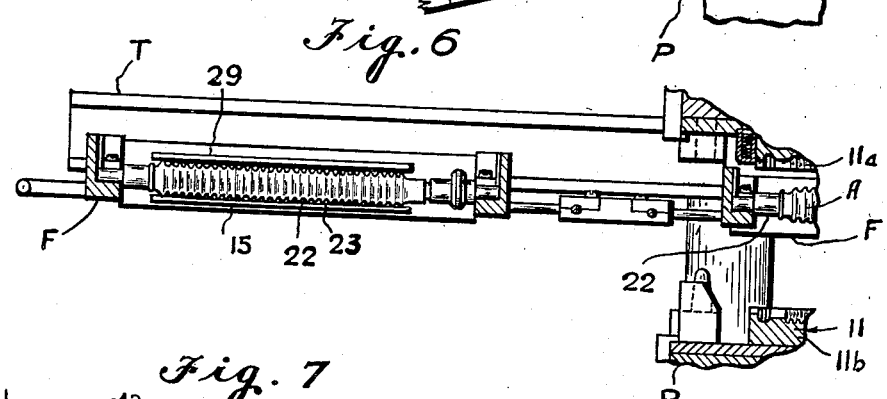
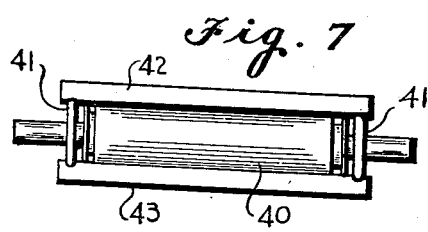
INVENTOR.
Frank Fenton
BY William Cleland
Attorney Jan. 1, 1952
F. FENTON
2,581,246
APPARATUS FOR LOADING VULCANIZING MOLDS
Filed July 21, 1945
4 Sheets-Sheet 4
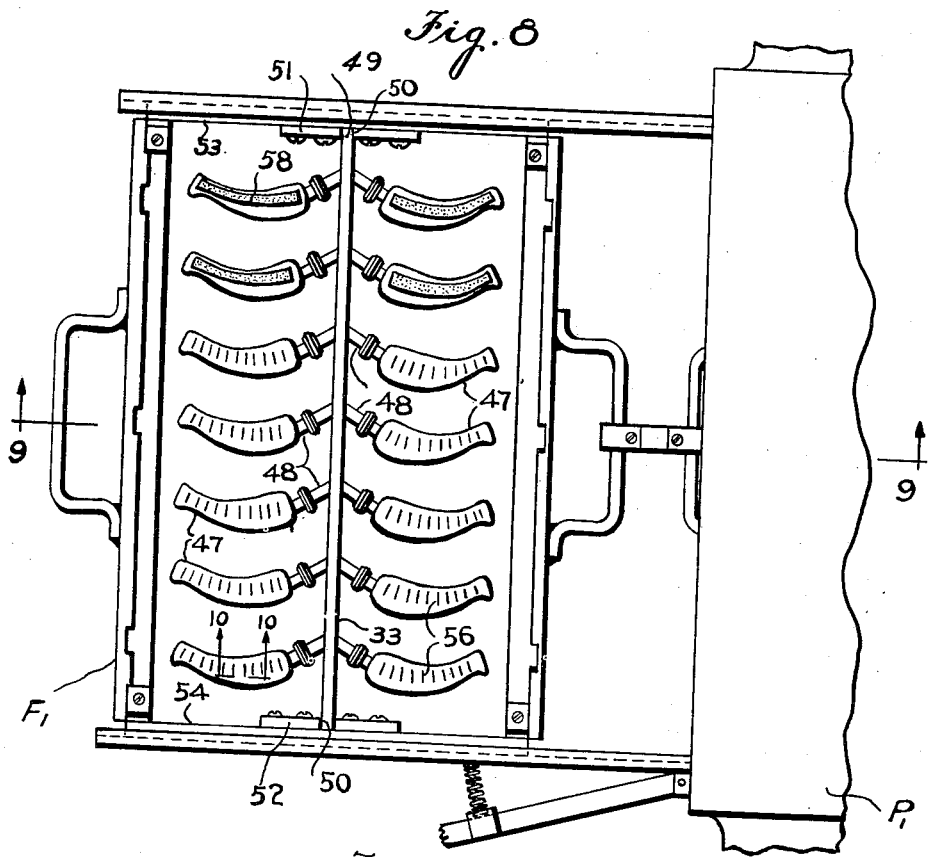
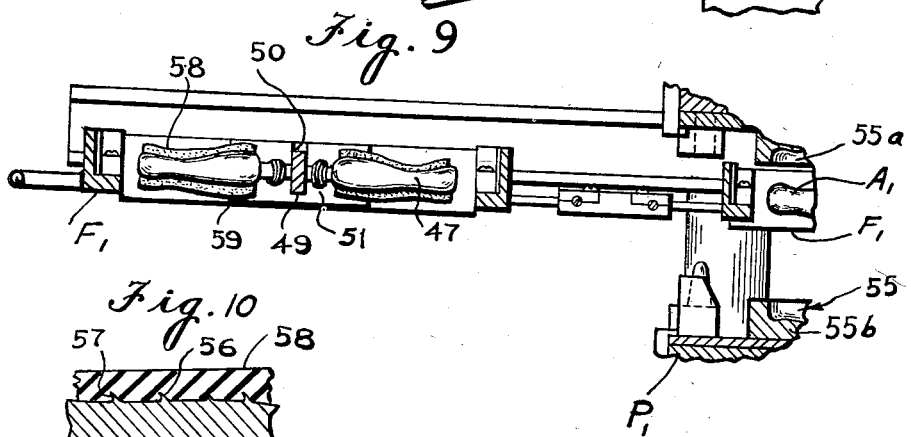
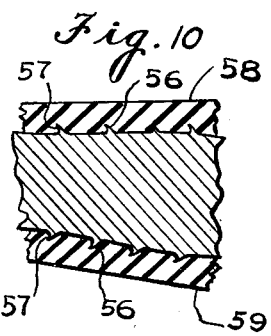
INVENTOR.
Frank Fenton
BY William Cleland
Attorney Patented Jan. 1, 1952

2,581,246

UNITED STATES PATENT OFFICE 2,581,246

APPARATUS FOR LOADING VULCANIZING MOLDS

Frank Fenton, Akron, Ohio, assignor to The Sun Rubber Company, Barberton, Ohio, a corporation of Ohio Application July 21, 1945, Serial No. 606,337

8 Claims. (Cl. 18—19)

This invention relates to apparatus for loading vulcanizing molds.

In the past it has been the general practice in loading molds of the type having article-forming cavities and article-forming cores receivable therein, as an example, to remove the cores after a vulcanizing cycle, place pieces of unvulcanized rubber stock in the bottoms of the mold cavities, return the cores to the molds and then after placing additional pieces of rubber stock on top of the cores to close the mold for another vulcanizing cycle of cooperation. This loading practice required the operators to work close to the hot mold during the loading operations, and also was uneconomical because the mold was out of use for vulcanizing while the loading was in process. In the production of elongated articles, such as corrugated tubes, the loading has been further complicated by the necessity of moving the lower half of the mold outwardly of the vulcanizing press to permit placement of elongated strips of rubber stock therein, this stock being of soft flexible nature.

A general object of the present invention is to provide mold loading apparatus by which substantially complete loading preparations may be made for one vulcanizing cycle of the mold while the same is in use for another vulcanizing cycle, thereby not only economizing on the use of the mold and operator's time, which is ordinarily at least partly wasted in waiting between vulcanizing cycles, but also making it possible for the loading operations to be efficiently and effectively carried out at a distance from the hot mold and therefore under comparatively more comfortable conditions than in the past.

Other objects of the invention will be manifest from the following brief description and the accompanying drawings.

Of the accompanying drawings:

Figure 1 is a top plan view, partly broken away, of mold loading apparatus embodying the features of the invention.

Figure 2 is a vertical cross-section, partly broken away, taken on line 2—2 of Figure 1.

Figure 3 is an enlarged fragmentary view taken on line 3—3 of Figure 1.

Figure 4 is a similarly enlarged cross-section, partly broken away, and taken on line 4—4 of Figure 1.

Figure 5 is a top plan view illustrating the article-forming cores with rubber stock thereon in process of being mounted on an intermediate core-supporting member for subsequent entry into a vulcanizer.

Figure 6 is a cross-section, taken on line 6—6 of Figure 5.

Figure 7 is a view illustrating another type of article-forming core having rubber stock adhered thereto in preparation for loading into a mold.

Figure 8 is a view similar to Figure 5 illustrating adaptation of a modified form of the invention to production of another type of product.

Figure 9 is a cross-section taken on line 9—9 of Figure 8, the same being similar to Figure 6.

Figure 10 is a fragmentary cross-section, taken substantially on line 10—10 in Figure 8, and illustrating particularly the modified form of core construction shown in Figures 8 and 9.

Referring particularly to Figures 1 to 4 of the drawings, the numeral 10 designates generally a fixture for supporting article-forming cores to be prepared for loading in a mold 11 (see Figure 6). The fixture 10 includes a relatively fixed lower member 12 in the nature of a table having a flat top part 13 in which is provided a plurality of longitudinally spaced recesses 14 for receiving strips of unvulcanized rubber or like material 15 of predetermined size. Provided at opposite sides of top part 13 may be supporting bars 17 each having spaced grooves 18 aligned with recesses 14, the grooves being open from the top of the bars for receiving reduced shank portions 19 and 20 on opposite ends of article-forming cores 22. The cores 22 illustrated herein are for producing corrugated rubber tubing, as for flexible tubing for gas-masks, oxygen masks, etc. The grooves 18 are arranged to receive the cores, as best shown in Figure 4, so that longitudinally spaced, relatively narrow convolutions or annular projections 23, 23 thereof will be embedded in the rubber strips 15, in a manner to be described.

Pivoted on a rod 24 mounted on spaced lugs 25 at one end of fixed top part 13, may be a channel-shaped upper member 26, through a flat web portion 27 of which may be elongate, longitudinally spaced recesses 28 adapted to coincide with recesses 14 when member 26 is swung to a closed position as shown in chain-dotted lines in Figure 2, and in full lines in Figures 3 and 4, in which position top strips 29 of unvulcanized rubber stock, like strips 15, are receivable through said recesses 28 to rest on top of the convolutions or projections 23 of the cores.

Also pivoted on rod 24 may be a channel-shaped pressure element 31, having a flat web portion 32, the element being adapted to be swung to a closed position thereof as shown in chain-dotted lines in Figures 2 and 3 and in full lines in Figure 4, in which position web portion 32 engages the strips 29 projecting through the recesses 28. Downward pressure applied manually to pressure element 32 will thus press the strips 29 against the upper portions of convolutions 23 of the cores 22, and in turn downward pressure of the cores will press the lower portions of the convolutions thereof into the lower strips 15. The cores 22 being preheated, as from use of the same in a prior vulcanizing operation in the mold 11, the heated portions of the convolutions 23 embedded in the upper and lower strips of unvulcanized rubber 15 and 29, respectively, will cause the rubber to become soft and tacky and to adhere to the cores (see Figures 3 and 4). The cores may thereafter, upon guide member 26 and pressure element 32 being swung to the open positions thereof, be lifted from the fixture 12 with the rubber strips 15 and 29 adhered thereto.

In the operation or use of the fixture described above, two series of cores may be utilized in co-operation with a sectional mold 11, in a vulcanizing press indicated at P in Figures 5 and 6, of the multiple-cavity type, so that while one series of cores is in use in the mold for a vulcanizing cycle, another series of cores removed from the mold after a previous vulcanizing cycle may have the completed corrugated tubing removed therefrom by known methods. The bare cores, while hot from the use thereof in said previous vulcanizing cycle in mold 11, are laid on strips of unvulcanized rubber 15 which the operator has previously placed in the recesses 14. Next, the operator upon swinging member 26 of the fixture downwardly as best shown in chain-dotted lines in Figure 2, may insert unvulcanized rubber strips 29 in the recesses 28 thereof, as previously described (see Figure 3), after which the pressure element 32 is swung to closed position (see Figures 2, 3 and 4) to embed the top and bottom portions of the convolutions 23 of the cores in the rubber strips, and thereby adhere the strips to the core as set forth above.

Upon opening fixture 12, the cores 22 with the rubber strips adhered thereto against gravitational displacement are transferred to a mold-loading frame F, which is slidable on a mounting comprising tracks T, at opposite sides of mold 11, (see Figure 5), this frame and mold construction being substantially as illustrated in copending application Serial No. 582,886, filed March 15, 1945, now Patent No. 2,463,560. As described in said application, the fully loaded frame F is shiftable on tracks T into cooperative position of the article-forming cores 22 with article-forming cavities of relatively movable upper and lower sections 11a and 11b (see Figure 6). Movement of frame F into mold 11, while the same is open, may be simultaneous with movement outwardly, at the opposite side of the mold, of a similar core-supporting frame shown in part at the right of Figure 6, the cores of which may be stripped and loaded with unvulcanized rubber strips on fixture 12 while the cores on the first-mentioned frame F are in use in the mold for a vulcanizing cycle. The two separate frames or parts F are suitably integrated or connected, as best shown in Figures 5 and 6, to be shiftable along the tracks T as a unitary framework.

Thus it will be seen that the apparatus and method described above obviates the necessity for the mold operators to wait for the completion of one vulcanizing cycle of the mold before placing the unvulcanized rubber strips in position for a subsequent vulcanizing cycle. It will also be readily seen that the foregoing procedure will obviate the usual necessity for the operators to reach between the hot mold sections to place rubber stock in the mold, as has been the custom in the past, or to remove the lower mold section from the vulcanizing press for this operation.

The invention has been described above particularly in connection with the production of corrugated rubber tubing, but it will be understood that the method of adhering rubber stock to hot cores or the like may be utilized in producing other articles, the cores of which do not necessarily have article-forming projecting portions to become embedded in the rubber. To this end a core 40, such as is shown in Figure 7, for an interiorly smooth surfaced article may be provided at opposite ends thereof with two or more relatively narrow annular ribs 41, adapted when hot to be embedded in strips of unvulcanized rubber stock 42 and 43, in the manner previously described, so that the stock will adhere in association with the article-forming part of the core. The projecting members to which the stock is adhered, when not utilized as article-forming portions of the core in the manner of corrugations 23 of core 22, need not be annular, but may be any suitable size and shape to accomplish the results set forth above.

In Figures 8 to 10 there is illustrated another form of the invention embodied in apparatus for vulcanizing, for example, hollow limbs for articulated rubber dolls. To this end there is provided a plurality of horizontally extending core members 47, 47 carried by shank portions 48, 48 which are secured in oppositely extending series to a supporting bar 49. The bar 49 is of flat stock, or is otherwise suitably formed at opposite ends thereof, to be non-rotatably received in recesses 50, 50 extending vertically from the top edges of plates 51 and 52 secured to opposite side members 53 and 54, respectively, of intermediate mold member or frame F1 which is similar to frame F (shown in Figures 5 and 6). The cores 47 are arranged on bar 49, removably if desired, to be in cooperating relation with article-forming cavities of upper and lower mold sections 55a and 55b of a multiple cavity mold 55 mounted in a vulcanizing press P1. As best seen in Figure 9, one supporting frame F1 at the right of the view is shown in position to be moved to the right to permit removal of completed articles A1 from cores 47, and a second frame F1 at the left of the view is illustrated as being ready for simultaneous movement to the right into cooperative relation with the mold as previously described, the two frames F1 being suitably connected to each other.

The cores 47 may be provided along the top and bottom surface portions thereof with longitudinally spaced laterally extending projections or barbs 56, 56. These barbs preferably extend angularly of said surface portion, as shown in Figure 10, to provide undercut or overhanging edge portions 57. The arrangement is such that whether the cores are hot or cold, strips of unvulcanized rubber stock 58 and 59 may be pressed along the top and bottom surface portions thereof, the angularly projecting barbs 56 thereby becoming embedded in the rubber strips, securely to retain the same on the cores. The adhesion will, of course, be aided by either the cores or the stock, or both being heated. The barbs 56 or equivalent means formed as by indenting, in any event, may be proportioned relatively small so as to provide desired adhesion of the strips, but without materially affecting the character of the interior wall structure of the finished article A1. For example, the strength of the article wall need not be materially affected. Suitably spaced projections or barbs, to serve the same purpose as barbs 56, may be formed on the surfaces of the cores as by making spaced indentations or notches with an indenting chisel or other tool.

The stock 58 and 59 may be applied to the cores by use of a fixture (not shown) similar to the fixture illustrated in Figures 1 to 4. The procedure in use of the modified apparatus is otherwise similar to that previously described in connection with Figures 1 to 6. It is understood that the projections 56 of the cores may be any shape or size to serve the desired purpose, the number of projections to a certain extent being governed by such shape and size.

Modifications of the invention may be resorted to without departing from the spirit thereof or the appended claims.

What is claimed is:

1. Loading equipment for a mold of the character described having an article-forming cavity, comprising an article-forming core having spaced projecting portions thereon, a support for removably supporting said core while removed from the mold, and means for positioning rubber or like vulcanizable stock on said support to be engageable with the spaced projections of a core supported on said support, said core, support and stock-positioning means being relatively movable to press the core projections into said positioned stock and thereby to adhere the stock across said projections, said core being adapted to be received in the article-forming cavity of the mold with said stock thereon.

2. Loading equipment for a vulcanizing mold having an article-forming cavity, comprising an article-forming core therefor provided with means for adhering rubber or like stock thereto, a support for removably supporting said core while removed from the mold, holding means on said support for releasably retaining a piece of rubber stock of predetermined size, means on said support operable to press said adhering means of the core against said releasably retained rubber stock, whereby said stock is released from said holding means and adhered to said core, said core being adapted to be received in the article-forming cavity of said mold with said stock thereon.

3. Loading equipment for a vulcanizing mold having an article-forming cavity, comprising an article-forming core provided with one or more projecting portions, a support for removably supporting said core while removed from the mold, means on said support for retaining a predetermined quantity of rubber stock, means on said support operable to press said projecting portion or portions against the rubber stock, whereby said rubber stock is adhered to said core, said cores being adapted to be received in the article-forming cavity of said mold with said stock thereon.

4. Loading equipment for a vulcanizing mold having a plurality of article-forming cavities, comprising a plurality of article-forming cores, each of said cores having spaced projections thereon, means for heating said projections, a core support, a bottom member on said support having a plurality of recesses of predetermined depths to the bottoms thereof for receiving rubber stock therein to be backed against said bottoms, and means on said support for mounting a plurality of said cores with said projections thereof to be engageable against the stock in corresponding said bottom-member recesses, whereby said core is depressible to adhere said rubber stock to said heated projections, said cores being adapted to be received in the article-forming cavities of the mold with said stock adhered thereon.

5. Loading equipment for a vulcanizing mold having a plurality of article-forming cavities, comprising a plurality of article-forming cores, each said core having a plurality of spaced projections thereon, a support, a bottom member on said support having a plurality of recesses of predetermined depths to the bottoms thereof for receiving rubber or like stock therein to be backed against said bottoms, means on said support for mounting said cores with said projections thereof engageable against the stock in corresponding said bottom-member recesses, a top member mounted on said support to be shiftable toward and from a closed position in association with said cores mounted on the support, said top member having a plurality of recesses opening therethrough for receiving rubber stock therein, and means shiftable toward said top member and having stock-backing portions cooperative with said top-member recesses when said top member is in closed position to press rubber stock received in the top-member recesses against upper portions of said core projections and also to press opposed portions of the core projections against the stock in the bottom-member recesses, the rubber stock thereby being adhered to opposed portions of said cores, said cores being adapted to be received in the article-forming cavities of the mold with said stock adhered thereon.

6. Loading equipment for a vulcanizing mold having a plurality of article forming cavities, comprising separate series of like article-forming cores, each series being separately receivable in the plurality of mold cavities, each of said cores having a plurality of spaced relatively narrow projections thereon adapted to be heated by vulcanizing heat of the mold, a core supporting fixture, said fixture having relatively movable members each provided with a plurality of guide means for reception of predetermined amounts of rubber or like stock, said members being relatively movable from and toward a closed position, means for mounting one of said separate series of cores between said members to be in alignment with said guide means when said members are relatively moved together, whereby the rubber stock received in said guide means of the members on contacting said projections of the cores while hot will adhere thereto, and a framework having separate though integrated parts each adapted to support one of the separate series of cores, and a mounting for supporting said framework to be shiftable to present any one of said core-supporting parts within the mold for cooperation with the mold cavities thereof while the other core-supporting part is thereby automatically presented outwardly of the mold, whereby a said outwardly presented core-supporting part is positioned for unloading and loading cores thereon while a series of stock-loaded cores in the other core-loading part is in the mold for a vulcanizing cycle of operation of the mold, said separate series of cores being adapted to be alternately received in the article-forming cavities of the mold with said stock thereon.

7. Loading equipment for a vulcanizing mold having a plurality of article-forming cavities, comprising a plurality of article-forming cores, each of said cores having longitudinally spaced relatively narrow projections thereon adapted to be preheated by use in the mold, a core supporting fixture, said fixture having relatively movable members each provided with a plurality of guide means for reception of predetermined amounts of rubber or like stock, means for mounting said cores between said members to be in association with said guide means when said members are relatively moved together, whereby the rubber stock on contacting said projections of the cores while hot will adhere thereto, said cores being adapted to be received in the article-forming cavities of the mold with said stock thereon.

8. Loading equipment for a vulcanizing mold having a plurality of article-forming cavities, comprising a plurality of article-forming cores, each of said cores having spaced means thereon for adhering rubber or like stock thereto, a core supporting fixture, said fixture having relatively movable members each provided with a plurality of guide means for reception of predetermined amounts of rubber or like stock, means for mounting said cores between said members to be in association with said guide means when said members are relatively moved together, whereby the rubber stock on contacting said spaced adhering means of the cores will adhere thereto, said cores being adapted to be received in the article-forming cavities of the mold with said stock thereon.

FRANK FENTON.

REFERENCES CITED

The following references are of record in the file of this patent:

UNITED STATES PATENTS

| Number | Name | Date |
| --- | --- | --- |
| 821,066 | Sonn | May 22, 1906 |
| 1,195,412 | Stimson | Aug. 22, 1916 |
| 1,296,092 | Kroeger | Mar. 4, 1919 |
| 1,676,325 | Doll | July 10, 1928 |
| 1,748,250 | Spang | Feb. 25, 1930 |
| 1,990,091 | Pfeifle | Feb. 5, 1935 |
| 2,003,092 | Richards | May 28, 1935 |
| 2,015,394 | Dray | Sept. 24, 1935 |
| 2,141,195 | Novak et al. | Dec. 27, 1938 |
| 2,143,960 | Stalter et al. | Jan. 17, 1939 |
| 2,370,294 | Dodge | Feb. 27, 1945 |